United States Patent
Ashinghurst et al.

(10) Patent No.: US 9,948,128 B2
(45) Date of Patent: Apr. 17, 2018

(54) POWER TOOL BATTERY PACK WIRELESS CHARGER

(71) Applicant: Black & Decker Inc., Newark, DE (US)

(72) Inventors: Jeremy D. Ashinghurst, Halethorpe, MD (US); Rouse Roby Bailey, Jr., New Park, PA (US); Jason F. Busschaert, Bel Air, MD (US); Scott J. Eshleman, Parkville, MD (US); Sankarshan Murthy, Mountain View, CA (US); Christine H. Potter, Phoenix, MD (US); Daniel Puzio, Baltimore, MD (US); Craig A. Schell, Street, MD (US)

(73) Assignee: Black & Decker Inc., New Britain, CT (US)

( * ) Notice: Subject to any disclaimer, the term of this patent is extended or adjusted under 35 U.S.C. 154(b) by 7 days.

(21) Appl. No.: 14/817,576

(22) Filed: Aug. 4, 2015

(65) Prior Publication Data
US 2016/0079800 A1   Mar. 17, 2016

Related U.S. Application Data

(63) Continuation of application No. 13/769,637, filed on Feb. 18, 2013, now Pat. No. 9,136,729.
(Continued)

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/0021* (2013.01); *H02J 7/0042* (2013.01); *H02J 7/027* (2013.01);
(Continued)

(58) Field of Classification Search
USPC ......................................................... 320/108
See application file for complete search history.

(56) References Cited

U.S. PATENT DOCUMENTS

2006/0281435 A1* 12/2006 Shearer ............. G06K 19/0707
455/343.1
2007/0279002 A1   12/2007 Partovi
(Continued)

FOREIGN PATENT DOCUMENTS

| EP | 1684396 A2 | 7/2006 |
|---|---|---|
| EP | 1868275 A2 | 12/2007 |
| WO | 2010131723 A1 | 11/2010 |

OTHER PUBLICATIONS

Philippe Grosse, Communication pursuant to Article 94(3) EPC, Jul. 29, 2016, the European Patent Office, Munich, Germany.

*Primary Examiner* — Mohammed Alam
(74) *Attorney, Agent, or Firm* — Adan Ayala

(57) ABSTRACT

A power tool system includes a power tool, a power tool battery pack and a battery pack charger. The power tool battery pack is separable from and attachable to the power tool, and electrically connectable to the power tool electrical terminals when attached to the power tool. The power tool battery pack has at least one battery cell, a receiver coil, and a control circuit for controlling the amount of power that is provided to the at least one battery cell. The battery pack charger has at least one transmitter coil for generating a magnetic field which induces a voltage in the receiver coil, and a control circuit for controlling the amount of power that is provided to the transmitter coil.

9 Claims, 3 Drawing Sheets

Related U.S. Application Data

(60) Provisional application No. 61/660,938, filed on Jun. 18, 2012.

(51) Int. Cl.
    *H02J 50/40* (2016.01)
    *H02J 50/12* (2016.01)

(52) U.S. Cl.
    CPC .............. *H02J 50/12* (2016.02); *H02J 50/40* (2016.02); *H02J 2007/0096* (2013.01)

(56) References Cited

U.S. PATENT DOCUMENTS

| | | | |
|---|---|---|---|
| 2009/0106567 A1 | 4/2009 | Baarman | |
| 2010/0181964 A1* | 7/2010 | Huggins | H02J 17/00 320/108 |
| 2011/0260681 A1* | 10/2011 | Guccione | H02J 7/0054 320/108 |
| 2012/0091949 A1* | 4/2012 | Campanella | H01F 38/14 320/108 |
| 2012/0187851 A1* | 7/2012 | Huggins | H05B 37/0218 315/159 |
| 2012/0235636 A1* | 9/2012 | Partovi | H02J 7/025 320/108 |

* cited by examiner

POWER TOOL BATTERY PACK WIRELESS CHARGER

CROSS-REFERENCE TO RELATED APPLICATION

The present application is a continuation of U.S. patent application Ser. No. 13/769,637, filed on Feb. 18, 2013, now U.S. Pat. No. 9,136,729, which in turn derives priority from U.S. Provisional Application No. 61/660,938, filed on Jun. 18, 2012, which is hereby fully incorporated by reference.

FIELD OF THE INVENTION

The present invention relates to a charger for power tool battery packs and particularly a wireless charger for power tool battery packs.

BACKGROUND

It is desirable to rapidly and efficiently charge power tool battery packs due to the increased demands placed by users on their power tools. As more users use different cordless power tools on the jobsite, the demand for charged batteries throughout the day has increased.

However, certain difficulties arise when charging multiple batteries from a single power source. Firstly, the charger must accommodate batteries having different levels of charge. Secondly, the charger must be capable of handling dynamic situations as users randomly remove or insert battery packs, without disrupting individual charging cycles. In addition, users desire to charge multiple types of batteries efficiently, such as battery packs having different voltages. Lastly, it is desirable for the battery charger to be able to address these concerns while maintaining its ability to rapidly and efficiently charge the multiple batteries.

DESCRIPTION

Figure 1:
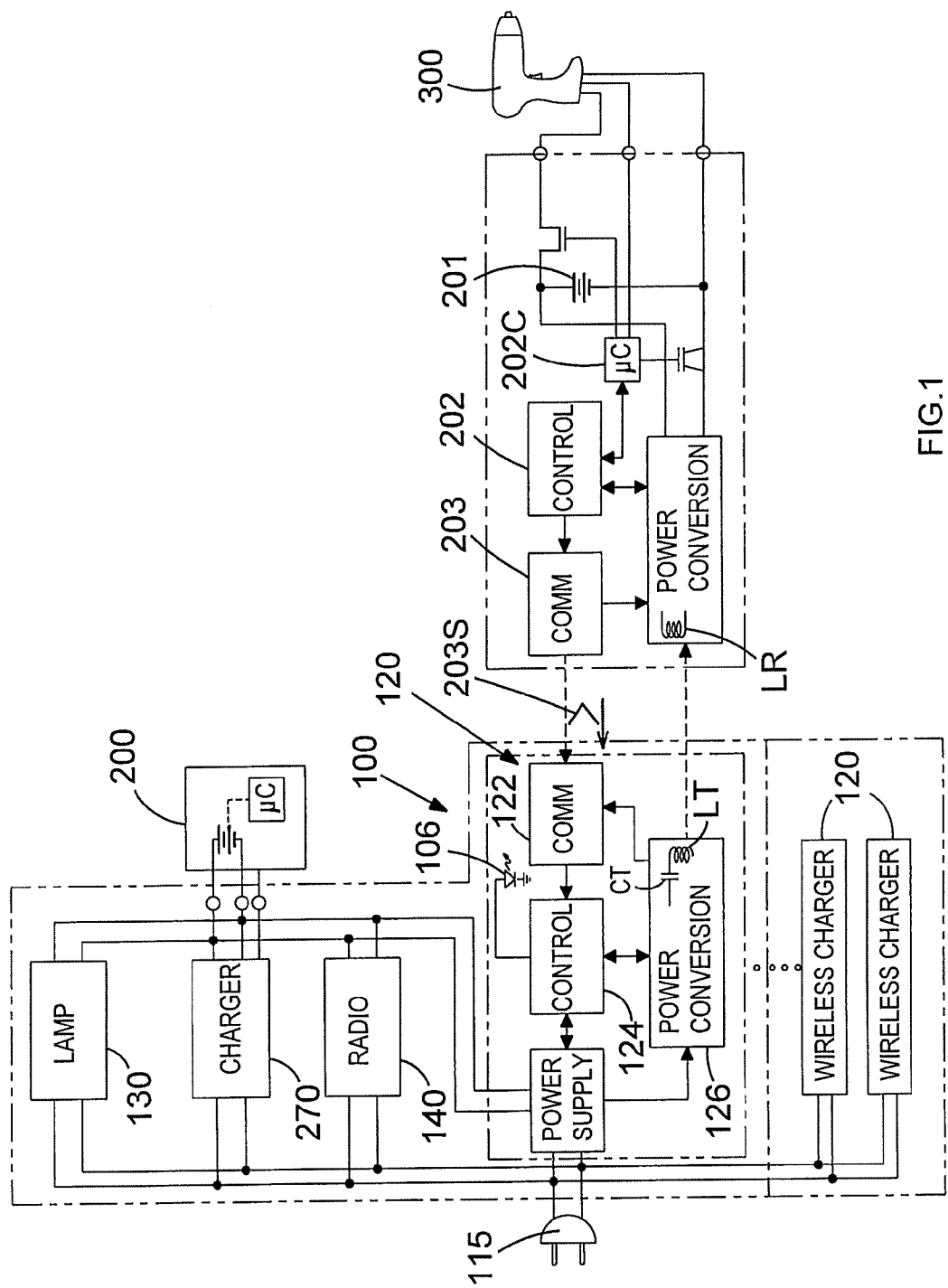
FIG. 1 is a partial schematic of the wireless charger.
Figure 2B:
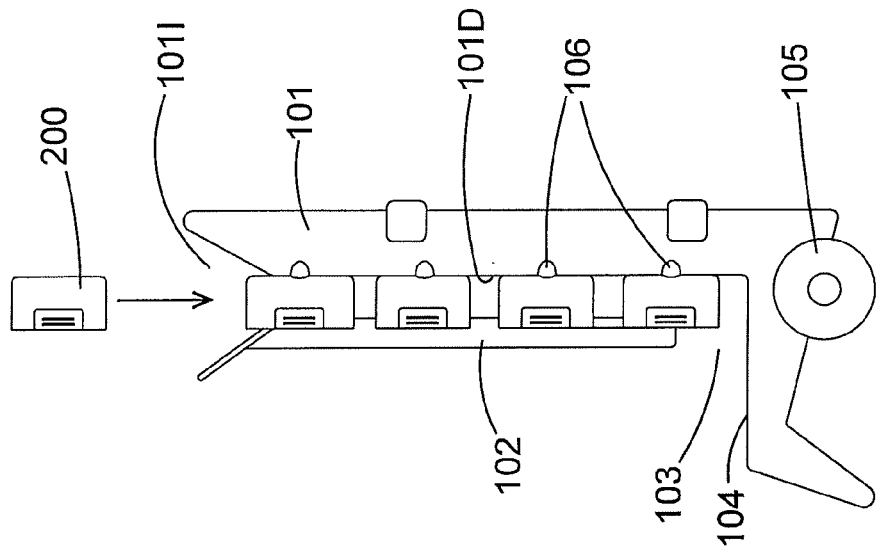
FIG. 2B is a side view of the wireless charger.
Figure 2A:
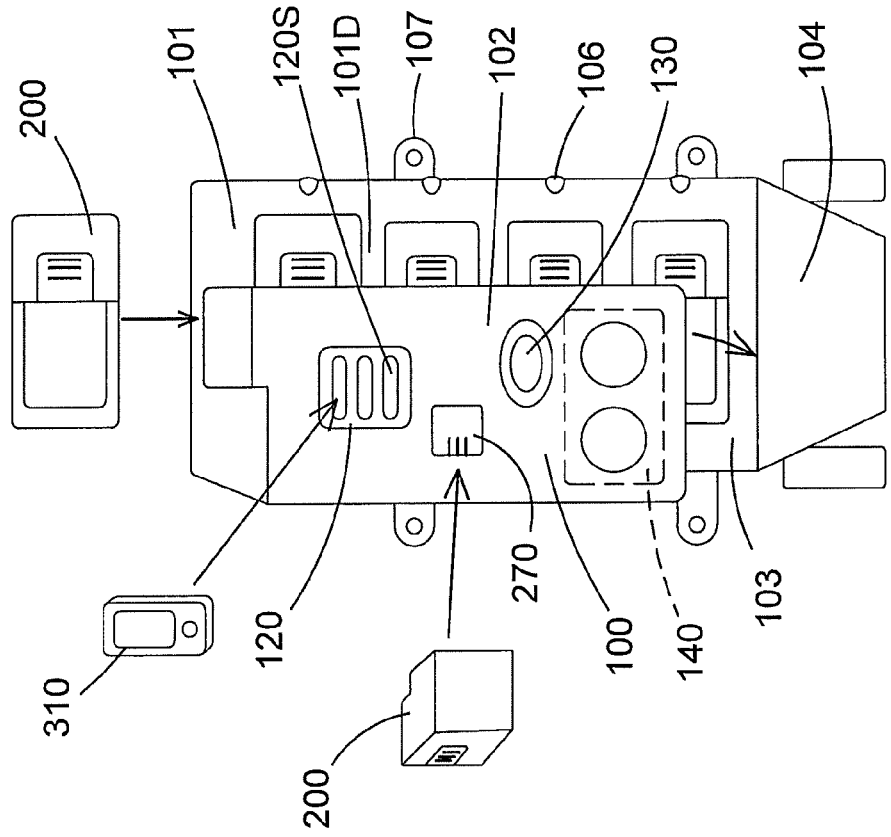
FIG. 2A is a front view of the wireless charger.

FIGS. 1-2B show a wireless charger 100 for charging multiple power tool battery packs 200. Persons skilled in the art shall understand that "battery pack" and "power tool battery pack" as used herein shall mean a set of rechargeable battery cells 201 disposed in a housing 202 that for use with a tool that is powered by an electrical motor, such as a drill 300, circular saw, reciprocating saw, jigsaw, etc. Persons skilled in the art shall recognize that power tool battery pack 200 may be the power tool battery packs disclosed in U.S. Pat. Nos. 7,405,536, 7,618,741, 7,602,146 and/or 8,044,640, which are hereby incorporated in full by reference, modified so as to be chargeable by a wireless charger.

The wireless charger 100 has a housing 101 with a deck 101D where a user can place multiple battery packs 200. Battery packs 200 are preferably sandwiched between deck 101D and wall 102. Deck 101D has several wireless charging circuits 120, which are described in more detail below. Power for the wireless charging circuits 120 may be received from a power cord 115.

With such construction, the user can slide in battery pack 200 via opening 101I. If deck 101D is disposed on an angle relative to the ground, the battery pack 200 may slide all the way to the bottom wall 104 of wireless charger 100. The user can continue sliding in battery packs 200.

Deck 101D preferably has indicator lights 106 right underneath battery packs 200 showing the charging status of the battery pack 200 thereabove. Once the bottom battery pack 200 is fully charged, the user can remove the pack 200 via the gap 103 between the bottom wall 104 and wall 102.

Persons skilled in the art will recognize that the different wireless charging circuits 120 can be controlled so that (a) only one battery pack 200 is charged at a time (once the battery pack 200 is charged, the next battery pack 200 can be charged), (b) each battery pack 200 is charged concurrently, and/or (c) the user can choose the order in which the battery packs 200 are charged (or the user can choose to charge all battery packs 200 at the same time).

Housing 101 may also have wheels 105 for facilitating transportation of wireless charger 100. Persons skilled in the art will also recognize that it is preferable to provide housing 101 with protrusions 107 with holes therethrough, which can be used for securing wireless charger 100 on a surface, such as a wall.

Wall 102 may also have a wireless charger circuit 120 thereon so as to allow users to charge other devices, such as cellphones 310, power tool battery packs (including those manufactured/sold by other manufacturers), etc. It may be advantageous to provide such charger circuit with anti-slip strips 120S. Persons skilled in the art will recognize that such devices may also be charged if placed on deck 101D.

Wireless charger 100 may also have a non-wireless charger circuit 270 to which a battery pack 200 may be electrically connected thereon. Persons skilled in the art will recognize that battery pack 200 will have terminals 205 to electrically connected to the terminals of charger circuit 270. Charger circuit 270 may be powered by AC received from power cord 115. Persons skilled in the art will recognize that battery pack 200 may be connected so as to power one or more of the wireless charging circuits 120. Persons skilled in the art shall recognize that charger circuit 270 may be the charger circuits disclosed in U.S. Pat. Nos. 7,405,536, 7,618,741, 7,602,146 and/or 8,044,640, which are hereby incorporated in full by reference.

Wireless charger 100 may have a lamp or light 130, which may be powered by AC received from power cord 115 or from a battery pack 200 connected to the charger circuit 270. Preferably such lamp 130 will output at least 1000 lumens.

Similarly, wireless charger 100 may have a radio 140, which may be powered by AC received from power cord 115 or from a battery pack 200 connected to the charger circuit 270.

Figure 4:
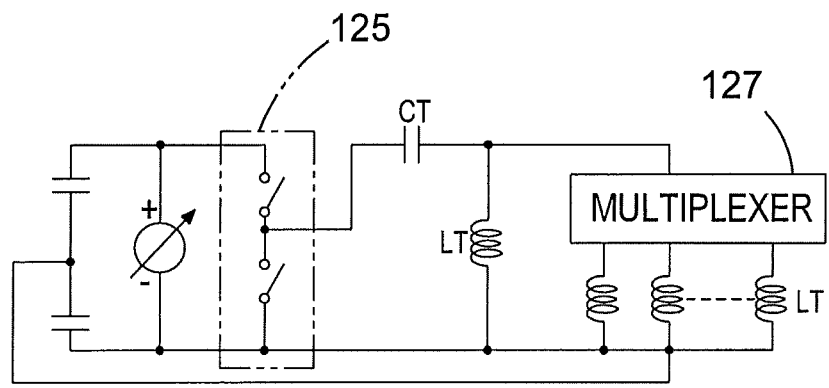
FIG. 4 is a circuit schematic of some of the components of the wireless charger.
Figure 5:
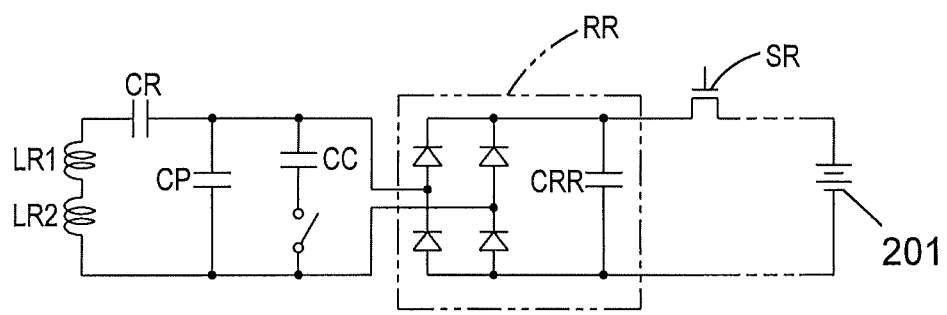
FIG. 5 is a circuit schematic of some of the components of the battery pack.

Referring to FIGS. 1 and 4-5, the wireless charger circuit 120 preferably has at least one transmitter coil LT, while the battery pack 200 has at least one receiver coil LR. An alternating current in the transmitter coil LT generates a magnetic field which induces a voltage in the receiver coil LR. This voltage is used to charge battery pack 200.

Persons skilled in the art will recognize that the wireless charger circuit 120 could have multiple transmitter coils LT. Alternatively it could have a moving transmitter coil LT so that, when the battery pack 200 is placed on wireless charger circuit 120, transmitter coil LT moves towards battery pack 200. Persons skilled in the art will recognize that battery pack 200 may have a magnet (not shown) that is used by wireless charger circuit 120 to locate the location of battery pack 200, and move transmitter coil LT via servo motors (not shown) towards battery pack 200.

Preferably the battery pack 200 has a control circuit 202, which controls the amount of power sent to the cells 201. Control circuit 202 interacts with microcontroller 202O to ensure that cells 201 are not overcharged.

Battery pack 200 may also have a communication circuit 203 that provides control information to the wireless charger circuit 120. Communication circuit 203 may send the control information by modulating a reflected load signal 203S. This information would be received by a communication circuit 122 on the wireless charger circuit 120, which demodulates the information from the reflected load signal 203S.

The wireless charger circuit 120 preferably has a control circuit 124 that controls the amount of power to be converted and transmitted to the battery pack 200. Control circuit 124 can take into account the information sent by control circuit 202 via the communication circuits 203, 122, and adjust the amount of power transmitted to battery pack 200.

The wireless charger circuit 120 has a power conversion circuit 126 with a transmitter coil LT and a resonance capacitor CT in series with the transmitter coil LT. Power may be converted by a half bridge inverter 125 connected to the inductor/capacitor series circuit. Persons skilled in the art shall know that it may be preferable to provide an impedance matching system by adding a multiplexer 127 and multiple additional transmitter coils LT to the wireless charger circuit 120 as shown in FIG. 4.

The battery pack 200 may have a receiver coil(s) LR (LR1, LR2) with a resonance capacitor CR in series with receiver coil(s) LR (LR1, LR2) for efficient power transfer. In addition, a capacitor CP in parallel with receiver coil LR (and resonance capacitor CR) can be used for detection purposes.

A full-bridge rectifier RR is preferably connected to the receiver coil LR and capacitors. Rectifier RR may be a diode rectifier or switched rectifier. Persons skilled in the art will recognize that it is preferable to provide rectifier RR with a capacitor CRR to smooth the DC voltage output.

A switch SR may be provided on the output of rectifier RR for connecting and disconnecting the battery cells 201. Switch SR may be controlled by control circuit 202 and/or microcontroller 202C.

Persons skilled in the art will recognize that battery pack 200 can modulate the reflected load signal 203S by switching capacitor CC, which is preferably controlled by communication circuit 203. This reflected load signal 203S can be demodulated by sensing the current and/or voltage going through transmitter coil LT. Preferably the modulation will be in a digital format with a transmission speed of 2 Kbit/second. Bit encoding is preferably bi-phase. The byte format may be as follows: start-bit, 8 bit data (b0-b7), parity-bit, stop bit. The packet structure may be as follows: preamble (>=11 bit), header (1 byte indicating packet type and message length), message (up to 27 bytes), and checksum (1 byte).

With such arrangement, the wireless charger circuit 120 can provide a signal and sense for the presence of a potential receiver. The battery pack 200 receives the signal from wireless charger circuit 120 and indicates its presence by communicating the received signal strength. The battery pack 200 can then communicate its identifier and power requirements. The wireless charger circuit 120 can use that information to configure itself for transferring power to the battery pack 200.

Once power is being transferred to battery pack 200, the control circuit 202 and/or microcontroller 202C can calculate the difference between a desired power level being sent to the battery pack 200 and the actual power level being sent to the battery pack 200. The communication circuit 203 can then send a message to the wireless charger circuit 120 effectively telling the wireless charger circuit 120 to increase or decrease the amount of power being sent to the battery pack 200. The wireless charger circuit 120 can decode the message and configure itself accordingly.

Figure 3:
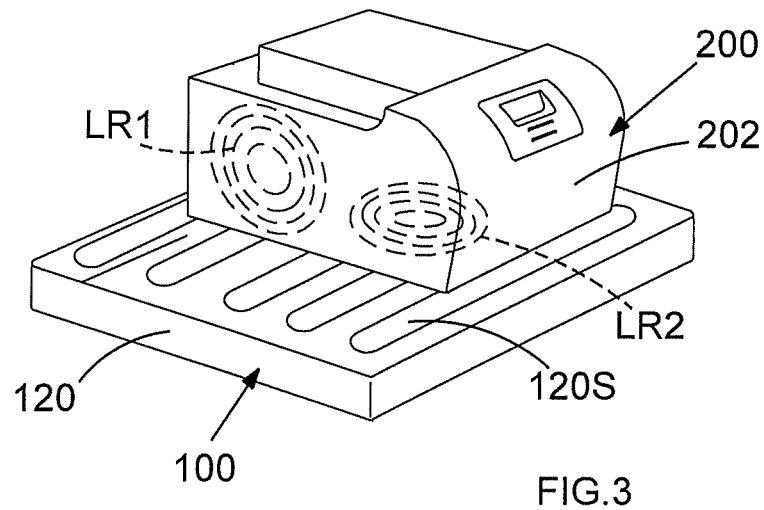
FIG. 3 shows a power tool battery pack on a wireless charger.

Referring to FIGS. 3 and 5, persons skilled in the art will recognize that battery pack 200 may have multiple receiver coils LR1 and LR2 on different planes, e.g. against the bottom wall and/or against a side wall. This allows the user to place the battery pack 200 on the bottom wall or on the side wall to charge the battery pack 200.

The description of the invention is merely exemplary in nature and, thus, variations that do not depart from the gist of the invention are intended to be within the scope of the invention. Such variations are not to be regarded as a departure from the scope of the invention.

What is claimed is:

1. A power tool system comprising:
    a power tool having a housing and electrical terminals disposed within the power tool;
    a first power tool battery pack separable from and attachable to the power tool housing, the first power tool battery pack being electrically connectable to the power tool electrical terminals when attached to the power tool, the first power tool battery pack comprising at least one battery cell, a receiver coil, and a control circuit for controlling the amount of power that is provided to the at least one battery cell; and
    a battery pack charger separable from and wirelessly connectable to the first power tool battery pack, the battery pack charger comprising at least one transmitter coil for generating a magnetic field which induces a voltage in the receiver coil, a control circuit for controlling the amount of power that is provided to the transmitter coil;
    wherein the first battery pack has a communication circuit providing control information to the battery pack charger control circuit.

2. The power tool system of claim 1, wherein the power tool is at least one of the group consisting of a drill, a circular saw, a reciprocating saw and a jigsaw.

3. The power tool system of claim 1, wherein the battery pack charger has a communication circuit that receives information from the battery pack communication circuit.

4. The power tool system of claim 3, wherein the battery pack charger communication circuit demodulates control information from a modulated load signal.

5. A wireless charger for charging multiple power tool battery packs, comprising:
    a housing with a substantially horizontal surface for supporting a first power tool battery pack, and a wall for directing movement of the first power tool battery pack relative to the surface;
    a first wireless charging circuit disposed within the housing, the first wireless charging circuit having a first transmitter coil disposed below the surface, a first control circuit for controlling the amount of power that is provided to the first transmitter coil, and a first communication circuit connected to the first control circuit, the first communication circuit that receives information from the first power tool battery pack; and a second wireless charging circuit disposed within the housing, the second wireless charging circuit having a second transmitter coil disposed below the deck, a second control circuit for controlling the amount of power that is provided to the second transmitter coil, and a second communication circuit connected to the second control circuit, the second communication circuit that receives information from a second power tool battery pack disposed on the surface.

6. The wireless charger of claim 5, wherein the first power tool can be moved along the surface to couple with the second wireless charging circuit for charging thereof.

7. The wireless charger of claim 5, further comprising a non-wireless charger circuit electrically connectable to a power tool battery pack.

8. The wireless charger of claim 5, further comprising an audio circuit for amplifying an audio signal generated by a radio circuit.

9. The wireless charger of claim 5, further comprising at least one indicator light disposed on the surface for indicating the charging status of at least one of the first and second power tool battery packs.

* * * * *